(12) United States Patent
Elbashir et al.

(10) Patent No.: US 11,591,213 B2
(45) Date of Patent: Feb. 28, 2023

(54) SYSTEM AND METHOD FOR CARBON AND SYNGAS PRODUCTION

(71) Applicant: QATAR FOUNDATION FOR EDUCATION, SCIENCE AND COMMUNITY DEVELOPMENT, Washington, DC (US)

(72) Inventors: Nimir O. Elbashir, Doha (QA); Mohamedsufiyan A. Challiwala, College Station, TX (US); Debalina Sengupta, College Station, TX (US); Mahmoud M. El-Halwagi, College Station, TX (US)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 584 days.

(21) Appl. No.: 16/500,800

(22) PCT Filed: Apr. 2, 2018

(86) PCT No.: PCT/US2018/025696
§ 371 (c)(1),
(2) Date: Oct. 3, 2019

(87) PCT Pub. No.: WO2018/187213
PCT Pub. Date: Oct. 11, 2018

(65) Prior Publication Data
US 2020/0109050 A1    Apr. 9, 2020

Related U.S. Application Data

(60) Provisional application No. 62/481,100, filed on Apr. 3, 2017.

(51) Int. Cl.
*C01B 3/38* (2006.01)
*C01B 32/05* (2017.01)

(52) U.S. Cl.
CPC .............. *C01B 3/382* (2013.01); *C01B 32/05* (2017.08); *C01B 2203/0233* (2013.01);
(Continued)

(58) Field of Classification Search
CPC .............................. C01B 3/382; C01B 32/05
(Continued)

(56) References Cited

U.S. PATENT DOCUMENTS 4,126,000 A * 11/1978 Funk ..................... F01K 3/185
60/648
7,794,690 B2    9/2010 Abatzoglou et al.
(Continued)

FOREIGN PATENT DOCUMENTS

JP    10245201 A    9/1998
JP    2009023859 A    2/2009
(Continued)

OTHER PUBLICATIONS

Parameter optimisation of carbon nanotubes synthesis via hexane decomposition over minerals generated from anadara granosa shells as the catalyst support. M.Z. Hussein et al. Journal of Nanomaterials V 2012 pp. 1-9 (Year: 2012).*
(Continued)

*Primary Examiner* — Douglas B Call
(74) *Attorney, Agent, or Firm* — Nath, Goldberg & Meyer; Richard C. Litman

(57) ABSTRACT

The present subject matter is directed to a system and method for producing carbon and syngas from carbon dioxide ($CO_2$). The system includes a first reactor (7) for producing solid carbon (15) from a feed including $CO_2$ and a volatile organic compound such as methane (1), and a
(Continued)

second reactor (20) for producing syngas. Reactions in the first reactor (7) are conducted in a limited oxygen atmosphere. The second reactor (20) can use dry reforming, steam reforming, and/or partial oxidation reforming to produce the syngas (22).

14 Claims, 6 Drawing Sheets

(52) U.S. Cl.
CPC ............ *C01B 2203/0238* (2013.01); *C01B 2203/0261* (2013.01); *C01B 2203/049* (2013.01); *C01B 2203/1223* (2013.01); *C01B 2203/1229* (2013.01); *C01B 2203/1241* (2013.01); *C01B 2203/142* (2013.01); *C01B 2203/84* (2013.01)

(58) Field of Classification Search
USPC ........................................................ 423/651
See application file for complete search history.

(56) References Cited

U.S. PATENT DOCUMENTS

| | | | |
|---|---|---|---|
| 2003/0162846 A1 | 8/2003 | Wang et al. | |
| 2006/0128818 A1* | 6/2006 | Wang | B01J 8/0488 518/703 |
| 2006/0292066 A1* | 12/2006 | Pez | C01B 3/56 423/648.1 |
| 2007/0172419 A1* | 7/2007 | Peng | C01B 3/46 252/373 |
| 2010/0298449 A1* | 11/2010 | Rojey | C10K 1/143 518/700 |
| 2012/0230897 A1* | 9/2012 | Abanades Garcia | F24V 30/00 423/230 |
| 2013/0284981 A1 | 10/2013 | Kim et al. | |
| 2015/0059527 A1* | 3/2015 | Noyes | C22B 21/06 75/561 |
| 2015/0071846 A1* | 3/2015 | Noyes | C01B 32/05 423/445 R |
| 2015/0321918 A1 | 11/2015 | Noyes | |
| 2017/0204335 A1 | 7/2017 | Ravikumar | |

FOREIGN PATENT DOCUMENTS

| | | |
|---|---|---|
| KR | 20060132293 A | 12/2006 |
| KR | 20090087298 B1 | 8/2009 |
| KR | 1020130026869 A | 3/2013 |
| KR | 1020150037398 A | 4/2015 |
| WO | 2013158158 A1 | 10/2013 |
| WO | 2013158440 A1 | 10/2013 |
| WO | 2015150503 A1 | 10/2015 |

OTHER PUBLICATIONS

Chung et al., "Simultaneous Generation of Syngas and Multiwalled Carbon Nanotube via CH4/CO2 Reforming with Spark Discharge", ACS Sustainable Chem. Eng., 5: pp. 206-212 (2017).

Examination Report in Australian application No. 2018249486, dated Sep. 3, 2021.

Chawla et al., "Production of synthesis gas by carbon dioxide reforming of methane over nickel based and perovskite catalysts", Procedia Engineering (2013), vol. 51, pp. 461-466.

* cited by examiner

SYSTEM AND METHOD FOR CARBON AND SYNGAS PRODUCTION

TECHNICAL FIELD

The disclosure of the present patent application relates generally to hydrocarbon reforming. In particular, the disclosure relates to an apparatus and method for producing carbon and synthesis gas (syngas) from carbon dioxide ($CO_2$).

BACKGROUND ART

The reforming of methane is one of the most common industrial processes for conversion of organic compounds (e.g., natural gas, which is composed primarily of methane) to synthesis gas (or "syngas") using an oxidant. Syngas, which is primarily a mixture of hydrogen and carbon monoxide, is an important feedstock for the production of a variety of value-added chemicals, particularly hydrocarbon cuts, such as liquid transportation fuels via Fischer-Tropsch synthesis, methanol and dimethyl ether, for example. The oxidant used for reforming of the methane determines its type. For example, in the case of steam reforming, steam is used as the oxidant. Steam reforming of methane uses the following reaction, with $\Delta H_{298}=206$ kJ/mol:

$$CH_4+H_2O \leftrightarrows CO+3H_2$$

In partial oxidation, oxygen is used as an oxidant to produce syngas. Partial oxidation of methane is performed as follows, with $\Delta H_{298}=-36$ kJ/mol:

$$CH_4+\tfrac{1}{2}O_2 \leftrightarrows CO+2H_2$$

In dry reforming, carbon dioxide is utilized for oxidation purposes, with $\Delta H_{298}=247$ kJ/mol:

$$CH_4+CO_2 \leftrightarrows 2CO+2H_2$$

Most research in methane reforming is directed towards improvement in the reactant conversions, either through new catalyst materials or by optimization of the operating conditions for a set objective. Recently, attention has been directed towards the "dry" reforming of methane due to its ability to convert the two greenhouse gases (i.e., methane and carbon dioxide) to syngas. However, the commercial applicability of dry reforming of methane has been very limited due to its inherent process limitations, such as carbon deposition, high endothermicity of the reaction, and low values of synthesis gas yield ratios ($H_2$:CO ratio). A well-accepted pathway for carbon formation, from methane, during the dry reforming reaction is given below:

$$CH_4(s) \rightarrow CH_x(s)+(4-x)H(s) \quad (1)$$

$$CH_x(s) \rightarrow C(s)+xH(s) \quad (2)$$

$$H(s)+H(s) \rightarrow H_2(g) \quad (3)$$

A pathway for carbon formation, from carbon dioxide, during the dry reforming reaction is as follows:

$$CO_2(g) \leftrightarrow CO(s)+O(s) \quad (4)$$

$$CO(s) \leftrightarrow C(s)+O(s) \quad (5)$$

$$O(s)+O(s) \leftrightarrow O_2(g) \quad (6)$$

$$O(s)+H(s)+H(s) \leftrightarrow H_2O(g) \quad (7)$$

Thus far, the implementation of such dry reforming reactions has typically suffered from carbon formation in the dry reforming reaction. The carbon formed on the surface of the catalyst deactivates the catalyst due to formation of the carbonate phase, thus either requiring frequent regeneration or, in certain cases, permanently destroying the active site. It would be desirable to design a reactor for implementing the dry reforming of methane with enhanced carbon dioxide fixation. Thus, a reactor system and process solving the aforementioned problems is desired.

SUMMARY

The present subject matter is directed to a system and method for producing carbon and syngas from carbon dioxide ($CO_2$). The system includes a first reactor for producing solid carbon from a feed including $CO_2$ and a volatile organic compound such as methane, and second reactor for producing syngas. Reactions in the first reactor are conducted in a limited oxygen atmosphere. The second reactor can use dry reforming, steam reforming, and/or partial oxidation reforming to produce the syngas. This technique significantly increases $CO_2$ fixation by separating the production of solid carbon and syngas.

In an embodiment, the present subject matter is directed to a two-stage reactor system for capturing carbon and producing syngas, comprising:
 a compression unit for compressing gas feed inputs;
 a first reactor configured for receiving the compressed gas feed and producing a solid carbon and unreacted gases;
 an electrostatic precipitator configured for receiving the unreacted gases and separating a recovered solid carbon and a reactor feed gas therefrom;
 a solid carbon and catalyst recovery unit configured for receiving the solid carbon from the first reactor and the recovered solid carbon from the precipitator;
 a heat exchanger configured for receiving the reactor feed gas from the precipitator and providing high temperature reactor feed gases; and
 a second reactor configured for receiving the high temperature reactor feed gases from the heat exchanger and providing an output of high temperature syngas back to the heat exchanger.

In an embodiment, the present subject matter is directed to a method comprising:
 providing a compressed feed gas comprising carbon dioxide and at least one volatile organic compound to a first reactor, the first reactor being a carbon generating reactor and comprising a first catalyst;
 producing a gaseous product and a solid carbon in the first reactor, the gaseous product including at least one of flue gases, carbon dioxide, and unreacted methane;
 removing the solid carbon from the first reactor;
 feeding the gaseous product produced in the first reactor to a second reactor to produce synthesis gas, the second reactor comprising a second catalyst, the second catalyst being different from the first catalyst.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION

Figure 1:
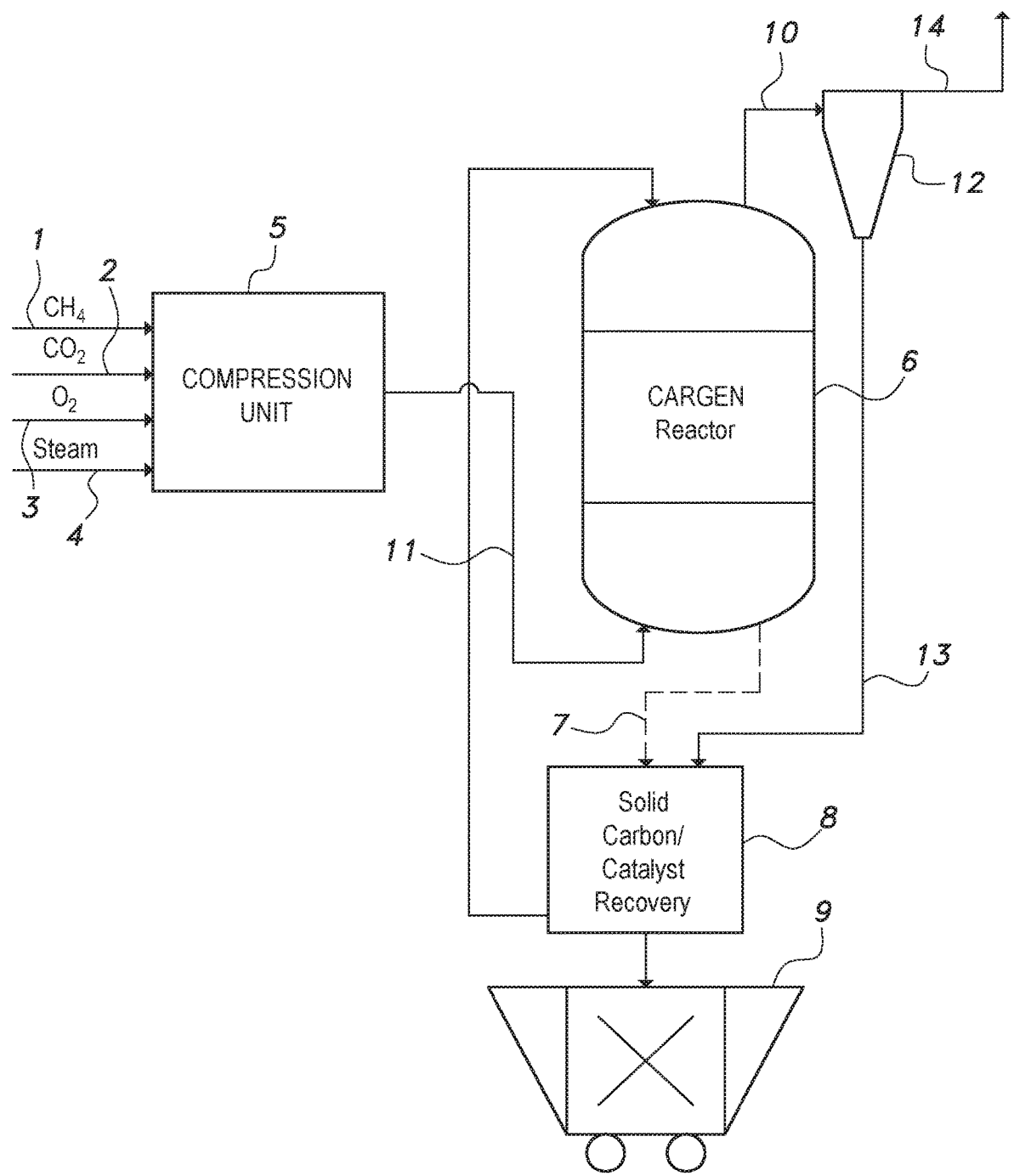
FIG. 1 shows a process flow diagram to depict operation of the carbon generator (CARGEN) reactor, according to the present subject matter.

According to an embodiment, the present subject matter relates to a two-reactor system that provides enhanced carbon dioxide utilization for chemical and fuels processes, while ensuring fixation of $CO_2$ e.g.; the amount of $CO_2$ utilized is less than that generated during the process. The first reactor converts $CH_4+CO_2$ to solid carbon, while the second reactor converts $CH_4+CO_2$ to syngas using a combined reforming reaction process. In view of the global concern of greenhouse gas emissions, the present system enhances overall $CO_2$ fixation, unlike conventional single reactor reformer systems. From a $CO_2$ life cycle assessment (LCA) and a process integration point of view, the present subject matter facilitates $CO_2$ utilization in methane reforming at fixation conditions while producing both solid carbon and syngas. The latter, syngas, is an important feedstock for production of a variety of value-added chemicals, as well as ultra-clean liquid fuels.

A combined reforming process in the present subject matter is aimed at reacting methane (or any other volatile organic compound) with $CO_2$, and optionally other oxidants such as $O_2$, $H_2O$, or both to produce syngas. As provided herein, optimal operational conditions of temperature and pressure of the two reactors can be determined using a thermodynamics equilibrium analysis. Any reaction feasible thermodynamically indicates that the reaction can be carried out, given that the hurdles associated with the process are tackled via the development of an efficient catalyst and reactor orientation.

The present subject matter aims to maximize $CO_2$ fixation by optimization of the operating conditions, which could maximize carbon formation in the first reactor, i.e., the Carbon Generator Reactor (CARGEN), in the limited presence of oxygen to drive the reaction auto-thermally. As the partial combustion or partial oxidation reaction is an exothermic reaction, the CARGEN reactor hosts two main reactions concerning the $CO_2$ fixation. The first reaction includes conversion of $CO_2$ to carbon. The second reaction includes a partial oxidation reaction utilizing a portion of methane (or any other volatile organic compound) for partial combustion to produce energy, among other products. The energy provided through partial oxidation reaction is more efficient compared to any other form of heat transfer, as this energy is generated in-situ in the process itself.

According to an embodiment, the CARGEN reactor may be operated under low temperature and low/high pressure conditions, while the combined reformer (second reactor) may be operated at high temperature and low/high pressure conditions. By tapping the advantage of pressure and temperature swings between the two reactor units, improvements occur in both $CO_2$ fixation, as well as reduction in overall energy requirements of the dual reactor setup. The present subject matter also utilizes work and energy extraction processes (like turbine, expanders etc.) associated with the change in pressure between the two reactors to overcome the pre-compression duty of the feed gas, at least partially. Thus, a unique synergism evident between the two reactors is beneficial for saving carbon credits, as well as improving sustainability of the overall process. In addition to the syngas generated from the second reactor (reformer reactor), the present process also produces solid carbon or carbonaceous material from the first reactor (CARGEN reactor). This carbonaceous product, which is produced as a part of the $CO_2$ fixation process, is industrially valuable. In particular, the carbonaceous product may serve as a starting material to produce many value-added chemicals that can generate substantial revenue for the process plant. Non-limiting examples of the valuable chemicals include activated carbon, carbon black, carbon fiber, graphite of different grades, earthen materials, etc. This material can also be added to structural materials like cement and concrete and in road tar or in wax preparation as a part of the overall $CO_2$ capture process.

The present subject matter includes utilization of a dry reforming process for conversion of carbon dioxide to syngas and carbon. The present subject matter enhances $CO_2$ fixation using a two-reactor setup or system. The reaction scheme is divided into two processes in separate reactors in series. The first reaction is targeted to capture $CO_2$ as solid carbon and the other to convert $CO_2$ to syngas. The present subject matter provides a systematic approach for $CO_2$ fixation.

The proposed scheme shows significant conversions of $CO_2$ to carbon at auto-thermal low temperature conditions (<773.15 K) in the first reactor of the two-reactor setup. The subsequent removal of solid carbon from the system (first reactor) enhances $CO_2$ conversions to syngas in the second reactor by thermodynamically pushing the reaction forward. As such, the carbon from the system is removed, which is incredibly beneficial from the perspective of the $CO_2$ life cycle assessment (LCA).

There has been much research devoted to development of a novel class of catalyst targeted to resist the formation of carbon, and thus protect it from deactivation, on its surface to reduce downtime. However, such catalysts are very expensive and affect the overall economics of the process. The present subject matter is more economical because it instead utilizes inexpensive catalysts in the first reactor. As a non-limiting example, the catalysts used may be the type of catalysts used in the reforming of biomass, such as calcite dolomite. Such catalysts are known to handle huge quantities of tar, a sticky material comprising solid carbon and other woody and inorganic materials.

After the reaction in the first reactor, the solid carbon is filtered. The remaining product gases are fed to a higher temperature second reactor (a combined reformer) with the main focus of producing high quality syngas. Thermodynamic analysis of the results of operation of the second reactor shows that there is no carbon formation. This drives the reaction forward at much lesser energy requirements (approximately 50 kJ less) and at relatively lower temperatures in comparison to conventional reformer setups. A substantial increase in the syngas yield ratio is also seen, which is not only beneficial for syngas production for Fischer Tropsch synthesis (requiring approximately a 2:1 $H_2$:CO ratio), but also for the hydrogen production (which requires high $H_2$:CO ratios).

In addition to the advantage of getting a higher $H_2$:CO ratio, a significant increase in the methane and carbon dioxide conversion is also seen at much lower operating temperatures. If a conventional reforming setup was used, such effects would be obtained only at higher temperatures (almost 250° C.). The advantage of removing carbon in the first reformer helps to bring down the operating temperature in the second reactor significantly. As such, the present subject matter is much more energy efficient than the conventional single reactor setup operated at higher temperatures to get similar levels of methane and carbon dioxide conversions at zero carbon deposition.

FIG. 1 shows a conceptual process flow diagram to depict operation of the carbon generator (CARGEN) reactor or the first reactor in the two-reactor system of the present teachings. A compression unit 5 receives inputs of methane 1, carbon dioxide 2, oxygen 3, and steam 4. The compression unit 5 provides an output 11 of compressed feed gas mix to the CARGEN reactor 6. The CARGEN reactor 6 provides an output of the unreacted gases 10, which goes to a cyclone or electrostatic precipitator 12 which provides outputs of unreacted methane, carbon dioxide, and steam 14 and recovered solid carbon 13. A solid carbon/catalyst recovery unit 8 receives inputs of the spent catalyst and solid carbon 7 from the CARGEN reactor 6 and the recovered solid carbon 13 from the cyclone or electrostatic precipitator 12. The catalyst recovered is regenerated and fed back to the CARGEN reactor 6 and the carbon is discarded to the discarded carbon and catalyst collector 9.

Figure 2:
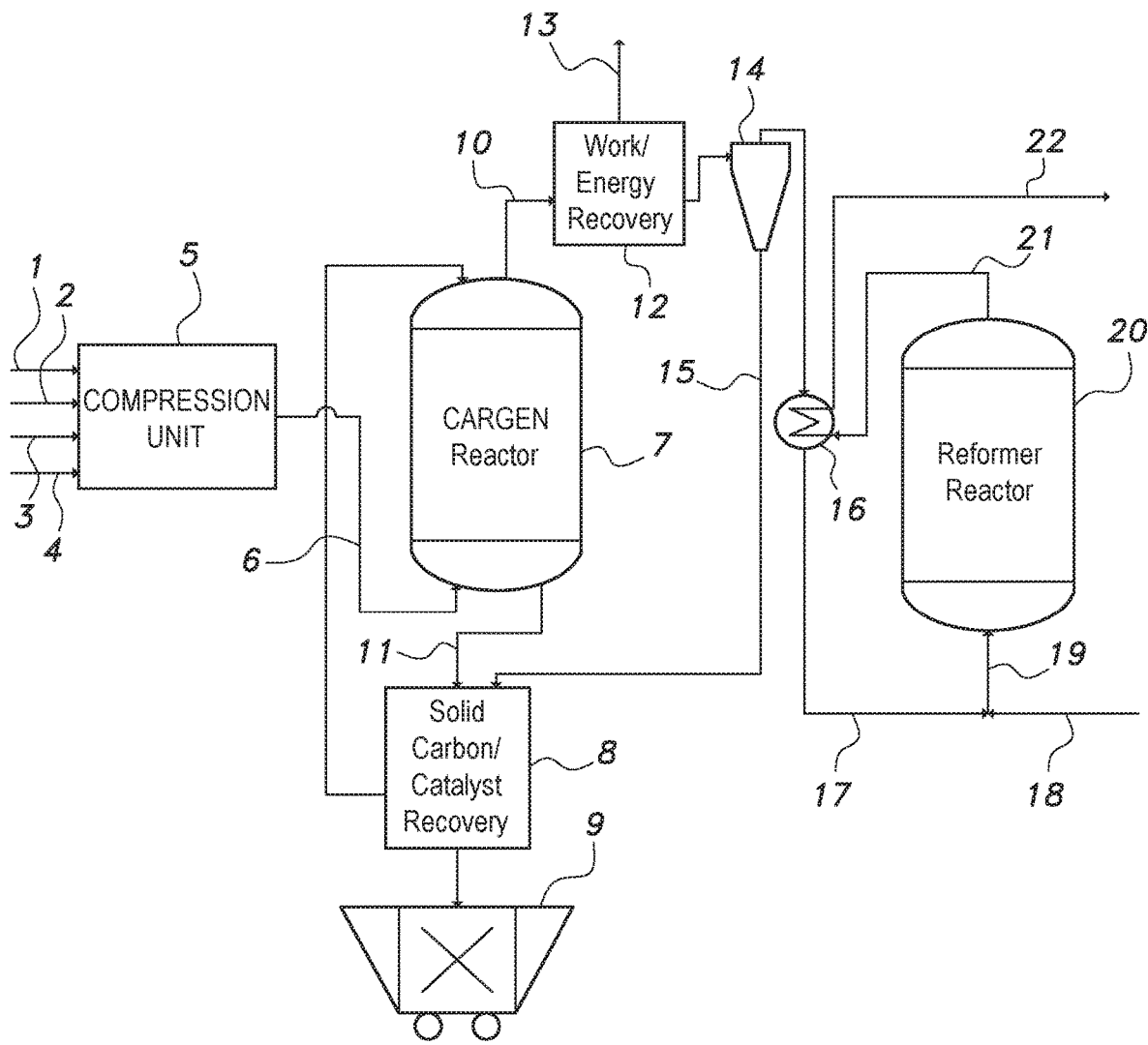
FIG. 2 shows a process flow diagram to depict operation of a two-reactor setup for enhanced $CO_2$ fixation, according to the present subject matter.

FIG. 2 is a non-limiting example of the two-reactor system according to the present subject matter. FIG. 2 shows a compression unit 5 receiving inputs of methane 1, carbon dioxide 2, oxygen 3, and steam 4. The compression unit 5 provides an output 6 of compressed feed gas mix to the CARGEN reactor 7. According to an embodiment, a work/energy recovery unit 12 can be provided. The CARGEN reactor 7 can provide an output 10 of unreacted gases from the CARGEN reactor at a high pressure to the work/energy recovery unit 12. The work/energy recovery unit 12 can then output extracted work/energy 13 and provide feed to the cyclone/electrostatic precipitator 14. The cyclone/electrostatic precipitator 14 provides outputs of recovered solid carbon 15 to the solid carbon/catalyst recovery unit 8. The solid carbon/catalyst recovery unit 8 regenerates the catalyst (removes carbon from the catalyst) and provides the catalyst back to the CARGEN reactor 7. Any carbon and/or catalyst to be discarded is directed to the discarded carbon/catalyst collector 9. The cyclone/electrostatic precipitator 14 also outputs unreacted methane, carbon dioxide, and/or steam to a heat exchanger unit 16. From the heat exchanger unit 16, high temperature and low pressure gases 17 are directed to the reformer reactor or second reactor 20. An additional feed of methane, oxygen, and steam 18 combine with the high temperature and low pressure gases from the heat exchanger unit 17 to serve as feed gases 19 to the reformer reactor 20. The reformer reactor 20 then outputs high temperature syngas 21 to the heat exchanger unit 16. The heat exchanger unit outputs low temperature syngas 22.

In particular, the present subject matter is directed to a systematic two-reactor setup to produce solid carbon and syngas separately in two reactors. The operational conditions of each reactor are maintained at such conditions that could promote and target each of the products, and inhibit the other, separately. The present subject matter is also directed to a reactor for carbon dioxide and methane conversion to solid carbon, referred to herein as Carbon Generator or "CARGEN". The present subject matter is further directed to a systematic procedure to utilize inexpensive catalyst in the CARGEN reactor for carbon deposition. The present subject matter is also directed to a method for removal and regeneration of inexpensive catalyst from CARGEN reactor for a continuous operation. The present subject matter is directed to a reforming reactor that may operate on multiple feeds at different operational conditions. The present subject matter is further directed to a systematic method to protect an expensive reforming catalyst from carbon formation by alteration of feed composition which comes as a product from the CARGEN reactor. The present subject matter is also directed to a synergistic approach to integrate energy and extract useful work from the streams exiting the CARGEN reactor.

It is noteworthy to understand the difference between the technology of the present subject matter and the conventional technology in terms of the perspective of the operation and targeted products. In the present process, carbon dioxide is partially utilized in the first reactor by co-feeding methane and/or oxygen and/or steam together or separately to the first reactor in order to produce solid carbon as product only. The operational conditions of the CARGEN reactor are chosen so that it promotes solid carbon and does not promote syngas. Consequently, the objective of the second reactor, a modified reforming reactor, is to produce syngas from the raw gas (mainly unconverted methane, carbon dioxide, steam, etc.) exiting the CARGEN reactor.

From the perspective of energy utilization and efficiency, the present process produces an environment conducive to production of a single product in two separate reactors. Additionally, the present approach may utilize a relatively inexpensive catalyst (e.g., naturally occurring minerals such as calcite dolomite, coal, etc.) in the first reactor (CARGEN) to help in improving carbon formation. Essentially, the present subject matter targets only those catalysts which are known for their coking tendency and as such, have been disregarded in the prior art for use in the reforming process. On the other hand, due to significant reduction of carbon dioxide concentration from the first reactor, carbon formation tendency of the second reactor is almost eliminated. Therefore, an avenue is opened for the utilization of expensive, high stability, and high resistance catalyst for a longer operational time on stream.

Further, due to the unique method of segregation of operational conditions in the two different reactors, the present system provides a unique opportunity for handling of the two products separately. For instance, the second reactor (which is mainly carbon formation free) does not need to undergo maintenance when the first reactor (CARGEN) is under maintenance. During such a situation, more than one CARGEN reactor could be added in parallel to ensure continuous operation.

Additionally, the catalyst removal process in the first reactor and the second reactor would be different, as the second reactor may utilize a more expensive catalyst and would not require many maintenance cycles, but could undergo regeneration more frequently. On the other hand, the first reactor may require many maintenance cycles and less frequent catalyst regeneration. The difference in the method of handling of catalysts and operational conditions for production of the two products separately makes the present process unique when compared to conventional systems and methods.

In an embodiment, the remaining reactant gas mixture is used for the reforming reaction in the separate second reactor for carrying out the dry reforming reaction, while discarding the sacrificial surface (catalyst) in the CARGEN. In an embodiment, the remaining reactant gas mixture is used for the reforming reaction in the second reactor for carrying out the combined dry reforming reaction and steam reforming reaction, while discarding the sacrificial surface (catalyst) in the CARGEN. In an embodiment, the remaining reactant gas mixture is used for the reforming reaction in the second reactor for carrying out the combined dry reforming, steam reforming, partial oxidation reforming, or any combination of the three, while discarding the sacrificial surface (catalyst) in the CARGEN.

In an embodiment, the inexpensive or sacrificial catalyst material is discarded in a batch-wise process while loading a new material. In an embodiment, the CARGEN is used for carbon capture while using the regenerated catalyst from a separate regenerator operated in parallel mode. In an embodiment, the sacrificial surface (catalyst) is treated separately to at least partially recover the catalyst while removing solids (including carbon and sacrificed material).

The CARGEN may, optionally, be operated under no additional steam basis, as addition of steam increases both the energy demands and compromises the formation of coke. However, in an embodiment, steam may be added to the second reformer (also called operated as combined Dry/Steam reforming) for increasing the conversion of the methane.

Addition of oxygen to both the CARGEN and/or to the combined reformer improves carbon capture performance, as it increases carbon formation in the CARGEN and also decreases the overall energy demands of the dual reactor setup.

Removal of the carbon (mechanically or with the spent catalyst) from the CARGEN pushes the reforming reaction forward in the second reactor (combined reformer) and thus subsequently increases the overall $CO_2$ and methane conversions to syngas significantly.

In an embodiment, steam may be added to the second reactor to produce hydrogen rich syngas for hydrogen production. Using steam in the second reactor increases hydrogen in the system significantly.

As non-limiting examples, the product gas mixture from the second reactor can at least be used as a feed stock for production of hydrogen, as a feed stock for Fischer Tropsch synthesis reaction, and as a feed stock for use as a source of energy in a hydrogen-based fuel cell. As non-limiting examples, the reactant gas may be an output product of a furnace in a process plant and may be a combination of the flue gases and/or carbon dioxide and unreacted methane.

A carbon material produced at temperatures below 773 K and at any pressure (preferably close to 25 bar) may be separated and used for any other process with or without the sacrificial material.

As non-limiting examples, the carbon material produced may be used in the mortar/road tar production industry, used in the cement or concrete manufacturing industry, used as earthen material or as a potential ingredient of synthetic manure, used as a source of energy, and used as an energy carrier. In a non-limiting example, the carbon material produced may be used for industrial production of carbon black and/or activated carbon, thus providing an alternative route to utilize carbon dioxide for carbon black production. This consequently could serve as technology for $CO_2$ capture by using a CARGEN reactor alone.

The overall process according to the present subject matter may be used as a carbon capturing technology in a Gas to Liquid process, which already uses a conventional reformer setup, by addition of a new CARGEN reactor upstream.

Synthesis gas produced from this process may be used for the production of a variety of value-added chemicals. As non-limiting examples, the value-added chemicals may be alcohols, Di-methyl ether (DME), oxygenates, acids, etc.

The CARGEN reactor may be operated under autothermal conditions by using oxygen as an additive for partial combustion (or oxidation) as the energy source. Autothermal low temperature (below 773 K) is associated with zero carbon credits, and thus has more impact in fixation of $CO_2$ from the life cycle of the process plant. The CARGEN reactor can be operated under low temperature and low/high pressure conditions, while the second reactor can be operated at high temperature and low/high pressure conditions.

In an embodiment, the first reactor (the CARGEN reactor) comprises a mechanical housing facility to receive methane, the carbon dioxide, and at least one more oxidant (oxygen etc). The first reactor may also comprise a housing/mechanism which actuates the removal and reloading (of a new batch or regenerated batch) of the sacrificial catalytic material for carbon capture. The captured carbon on the sacrificial catalyst material may be recovered partially or completely based on the cost benefit analysis.

A pretreatment process may be incorporated between the two reactors, which comprises of heating, cyclone separation, and mixing of an additional oxidant (oxygen or steam or both with the gases leaving the CARGEN) for the second combined reformer. In such a process, the catalyst chosen is compatible for combined reforming reaction in the second reactor.

In an embodiment, a pressure swing between the two reactors with a high pressure in first reactor and lower pressure in a second reactor can significantly affect carbon formation and energy requirements in the overall system. In an embodiment, a pressure swing between the two reactors with a lower pressure in first reactor and higher pressure in a second reactor significantly reduces net energy demands, but decreases overall $CO_2$% conversion.

In an embodiment, the most optimum scheme as an outcome of the present subject matter is operation of the first reactor under auto-thermal conditions (by addition of pure oxygen along with $CO_2$ and methane) at a pressure higher than the second reactor, with no addition of steam to both the reactors. Steam may however be added only to increase hydrogen content of product syngas if needed (for hydrogen production etc.).

In an embodiment, pressure swings between the reactors may be achieved by using an expander unit which decreases the pressure while deriving high quality shaft work, which may be used elsewhere in the plant. In an embodiment, pressure swings between the reactors may be achieved by using a turbine generator unit which decreases the pressure while deriving high quality shaft work, which could be used elsewhere in the plant.

The carbon dioxide capture process may be carried out in a continuous operation by at least one additional train to switch back and forth during cycles of maintenance and operations.

In an embodiment, the present process may be carried out by using any potential volatile organic compound (e.g., ethanol, methanol, glycerol etc.) in place of methane or any such combinations.

In an embodiment, the present subject matter may be combined with a novel system for precipitating, aggregating, filtering, and intercepting coke formation in order to efficiently utilize the sacrificial catalytic material or to allow a better regeneration process.

In addition, the proposed configuration of the CARGEN reactor may be utilized for the production of a carbonaceous compound alone as carbon dioxide fixation from the CARGEN process. In particular, this may pertain to industrial production of black ink for printers and pertain to industrial production of graphite of different grades, which may be used for manufacturing of cast iron/steel or batteries of different grades.

Furthermore, as shown in the specific case examples provided herein, the energy utilization of the combined process is extremely low (almost 50%) compared to existing technologies. The present process also has the benefit of high efficiency, as the present process has the capability to convert more than 65% $CO_2$ per pass of reactor.

EXAMPLES

Example 1

Figure 3:
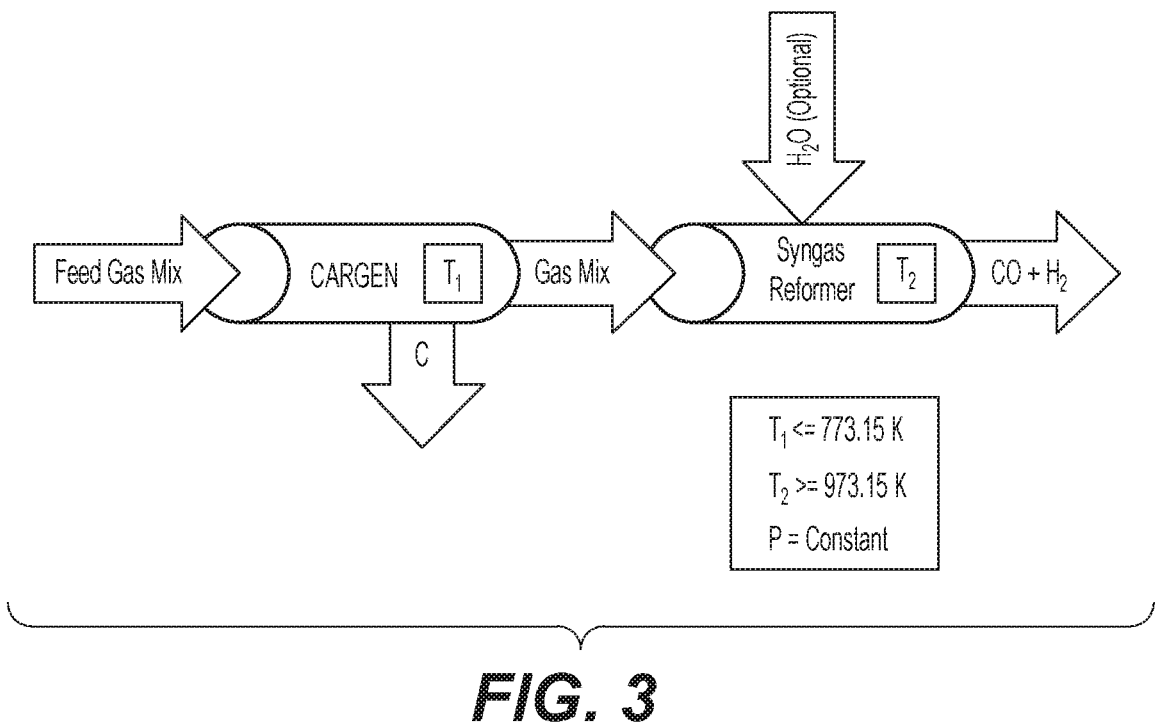
FIG. 3 shows an embodiment according to Example 1 of the present subject matter.

This embodiment is specific to the choice of feed to the reactors. FIG. 3 shows a schematic of the two-reactor system. The first reactor (CARGEN) is dedicated to maximize the conversion of the carbon dioxide to solid carbon while maintaining operating conditions under auto-thermal conditions or mild exothermic conditions. The feed to this reactor essentially includes methane, carbon dioxide, oxygen, and steam in a particular ratio. Steam can optionally be provided to the second reactor. The second reactor (Syngas Reformer) is a reformer to produce syngas using a combined reforming reaction. The quality of produced syngas can be appropriate for Fischer Tropsch synthesis or to produce hydrogen.

This particular scenario is also a general case, which is valid for EXAMPLES 2-5. In this, the operating temperature of the first reactor (CARGEN unit) as shown in FIG. 3, should be maintained below 773.15 K for enhanced conversion of the $CO_2$ in the feed gas mix (containing any combination of feeds described in EXAMPLES 2-5) to carbon while producing negligible CO and $H_2$ generation to serve the purpose of the CARGEN unit (which is carbon generation). In this embodiment, however, the pressures of both the reactors should, be maintained constant without a pressure swing across the reactors. The temperature of the second reactor should be maintained above 973.15 K in order to maximize syngas generation and get zero carbon formation.

The following case example relates to EXAMPLE 1 in which the feed contains methane, carbon dioxide, steam, and oxygen in the composition listed in Table 1 below.

TABLE 1

Feed Composition and Operating Conditions of Reactors

| Component Fed/<br>Operating Condition | Value |
| --- | --- |
| $CH_4$ | 1 mole |
| $H_2O$ | 0.6 mole |
| $O_2$ | 0.1 mole |
| $CO_2$ | 0.6 mole |
| $T_1$ (reactor 1) | 693.15K |
| $P_1$ (reactor 1) | 25 bar |
| $T_2$ (reactor 2) | 1093.15K |
| $P_2$ (reactor 2) | 25 bar |

TABLE 2

Product Composition of Reactors

| Product | Reactor 1 Composition | Reactor 2 Composition |
| --- | --- | --- |
| $CH_4$ | 0.6516 | 0.2467 |
| $H_2O$ | 1.2185 | 0.8695 |
| $O_2$ | 0 | 0 |
| CO | 0.0025 | 0.4632 |
| $CO_2$ | 0.3895 | 0.3336 |
| $H_2$ | 0.0783 | 1.237 |
| Carbon | 0.5564 | 0 |
| Energy (Kj) | −1.074 | 176.04 |
| $CO_2$% conversion | 35 | 44.4 |

As can be seen in Table 2, the carbon formation in reactor 1 is significantly high with $CO_2$% conversion of 35%, and the corresponding energy requirement is −1.074 kJ. On the other hand, the carbon formation in reactor 2 is zero with an energy requirement of 176.04 kJ. The overall $CO_2$% conversion after reactor 2 is 44.4%.

Example 2

Figure 4:
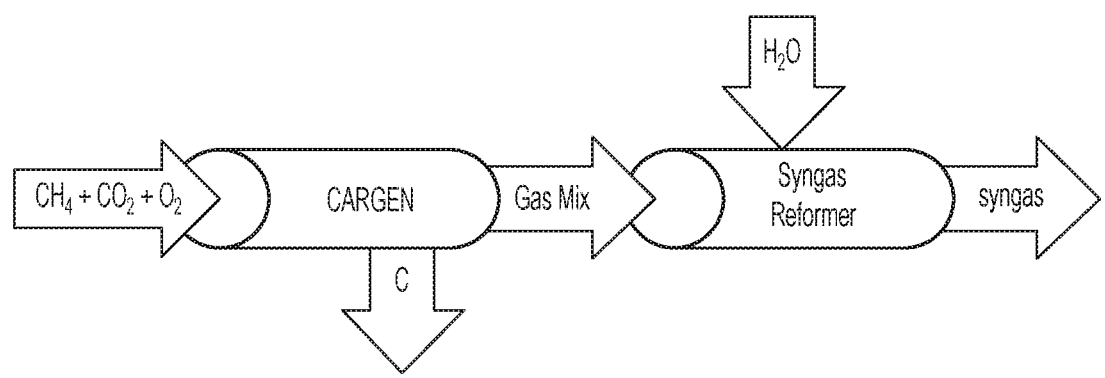
FIG. 4 shows an embodiment according to Example 2 of the present subject matter.

This embodiment is specific to the choice of feed to the reactors. FIG. 4 shows a schematic of the two-reactor set up as described in EXAMPLE 1. The feed to this reactor essentially contains methane, carbon dioxide, and oxygen in different ratios. The gas mixture leaving the first reactor (CARGEN unit) is sent to the second reactor, in which steam is also added to increase the hydrogen content of the syngas produced from the reforming reaction (in reactor 2).

The following case example relates to EXAMPLE 2 in which the feed to the first reactor contains methane, carbon dioxide and oxygen, while steam is fed to the second reactor. The feed compositions are listed in Table 3 below.

TABLE 3

Feed Composition and Operating Conditions of Reactors

| Component Fed/<br>Operating Condition | Value |
| --- | --- |
| $CH_4$ (reactor 1) | 1 mole |
| $O_2$ (reactor 1) | 0.1 mole |
| $CO_2$ (reactor 1) | 0.6 mole |
| $H_2O$ (reactor 2) | 0.6 mole |
| $T_1$ (reactor 1) | 693.15K |
| $P_1$ (reactor 1) | 25 bar |
| $T_2$ (reactor 2) | 1093.15K |
| $P_2$ (reactor 2) | 25 bar |

TABLE 4

Product Composition of Reactors

| Product | Reactor 1 Composition | Reactor 2 Composition |
| --- | --- | --- |
| $CH_4$ | 0.526209 | 0.146265 |
| $H_2O$ | 0.887064 | 1.076974 |
| $O_2$ | 0 | 0 |
| CO | 0.001769 | 0.330415 |
| $CO_2$ | 0.255583 | 0.296305 |
| $H_2$ | 0.06051 | 1.23049 |
| Carbon | 0.8164 | 0 |
| Energy (Kj) | −11.9547 | 163.021 |
| $CO_2$% conversion | 57.4 | 50.6 |

As can be seen in Table 4, the carbon formation in reactor 1 is 0.8164 moles with $CO_2$% conversion of 57.4%, and the corresponding energy requirement is −11.9547 kJ. On the other hand, the carbon formation in reactor 2 is zero with an energy requirement of 163.021 kJ. The overall $CO_2$% conversion after reactor 2 is 50.6%. The drop-in $CO_2$% conversion could be attributed to water gas shift reaction, which negatively effects the $CO_2$ conversion.

Example 3

Figure 5:
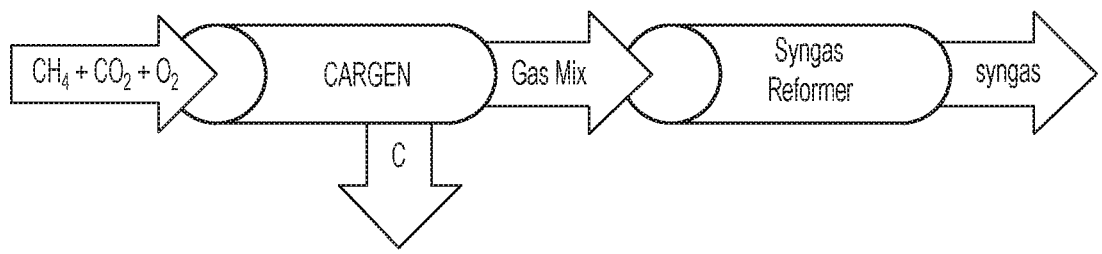
FIG. 5 shows an embodiment according to Example 3 of the present subject matter.

This embodiment is specific to the choice of feed to the reactors. FIG. 5 shows a schematic of the two-reactor set up as described in EXAMPLE 1. The feed to this reactor essentially contains methane, carbon dioxide, and oxygen in different ratios. The gas mixture leaving the first reactor (CARGEN unit) is sent to the second reactor in which reforming reaction takes place at a different operating condition.

The following case example relates to EXAMPLE 3 in which the feed to the first reactor contains methane, carbon dioxide, and oxygen, while no oxidant is fed to the second reactor. The feed compositions are listed in Table 5 below.

TABLE 5

Feed Composition and Operating Conditions of Reactors

| Component Fed/ Operating Condition | Value |
|---|---|
| $CH_4$ (reactor 1) | 1 mole |
| $O_2$ (reactor 1) | 0.1 mole |
| $CO_2$ (reactor 1) | 0.6 mole |
| $T_1$ (reactor 1) | 693.15K |
| $P_1$ (reactor 1) | 25 bar |
| $T_2$ (reactor 2) | 1093.15K |
| $P_2$ (reactor 2) | 25 bar |

TABLE 6

Product Composition of Reactors

| Product | Reactor 1 Composition | Reactor 2 Composition |
|---|---|---|
| $CH_4$ | 0.526209 | 0.2168 |
| $H_2O$ | 0.887064 | 0.6095 |
| $O_2$ | 0 | 0 |
| CO | 0.001769 | 0.343 |
| $CO_2$ | 0.255583 | 0.2238 |
| $H_2$ | 0.06051 | 0.9569 |
| Carbon | 0.8164 | 0 |
| Energy (Kj) | −11.9547 | 132.53 |
| $CO_2$% conversion | 57.4 | 62.7 |

As can be seen in Table 6, the carbon formation in reactor 1 is 0.8164 moles with $CO_2$% conversion of 57.4%, and the corresponding energy requirement is −11.9547 kJ. On the other hand, the carbon formation in reactor 2 is zero with an energy requirement of 132.53 kJ. The overall $CO_2$% conversion after reactor 2 is at 62.7%. The increase in $CO_2$% conversion could be attributed to favorable forward dry reforming reaction and reverse water gas shift reaction due to removal of carbon formed in CARGEN reactor (reactor 1).

Example 4

Figure 6:
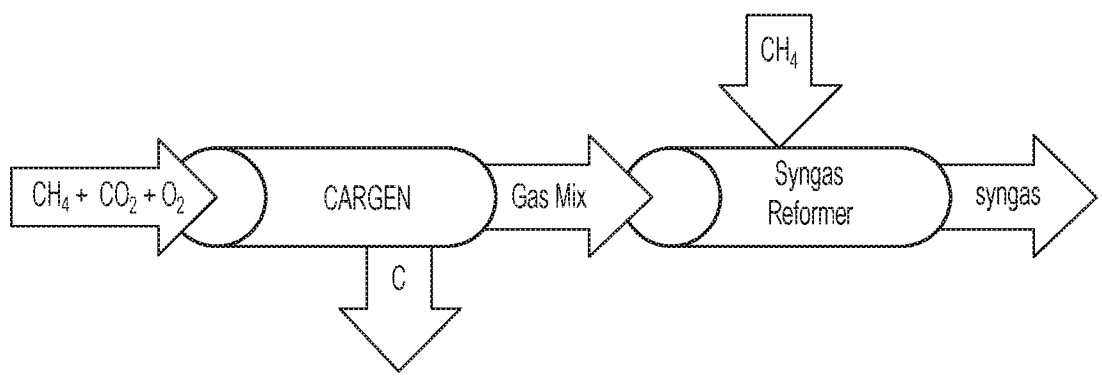
FIG. 6 shows an embodiment according to Example 4 of the present subject matter.

This embodiment is specific to the choice of feed to the reactors. FIG. 6 shows a schematic of the two-reactor set up as described in EXAMPLE 1. The feed to this reactor essentially contains methane, carbon dioxide, and oxygen in different ratios. The gas mixture leaving the first reactor (CARGEN unit) is sent to the second reactor in which additional methane is added to increase carbon content of the syngas produced during the combined reforming reaction.

The following case example relates to EXAMPLE 4 in which the feed to the first reactor contains methane, carbon dioxide, and oxygen, while additional methane is fed to the second reactor to increase carbon content of the product syngas. The feed compositions are listed in Table 7 below.

TABLE 7

Feed Composition and Operating Conditions of Reactors

| Component Fed/ Operating Condition | Value |
|---|---|
| $CH_4$ (reactor 1) | 1 mole |
| $O_2$ (reactor 1) | 0.1 mole |
| $CO_2$ (reactor 1) | 0.6 mole |
| $CH_4$ (reactor 2) | 0.3 mole |
| $T_1$ (reactor 1) | 693.15K |
| $P_1$ (reactor 1) | 25 bar |
| $T_2$ (reactor 2) | 1093.15K |
| $P_2$ (reactor 2) | 25 bar |

TABLE 8

Product Composition of Reactors

| Product | Reactor 1 Composition | Reactor 2 Composition |
|---|---|---|
| $CH_4$ | 0.526209 | 0.431079 |
| $H_2O$ | 0.887064 | 0.540989 |
| $O_2$ | 0 | 0 |
| CO | 0.001769 | 0.445953 |
| $CO_2$ | 0.255583 | 0.206529 |
| $H_2$ | 0.06051 | 1.19685 |
| Carbon | 0.8164 | 0 |
| Energy (Kj) | −11.9547 | 166.0787 |
| $CO_2$% conversion | 57.4 | 65.6 |

As can be seen in Table 8, the carbon formation in reactor 1 is 0.8164 moles with $CO_2$% conversion of 57.4%, and the corresponding energy requirement is −11.9547 kJ. On the other hand, the carbon formation in the reactor 2 is zero with an energy requirement of 166.0787 kJ. The overall $CO_2$% conversion after reactor 2 is at 65.6%. The increase in $CO_2$% conversion could be attributed to favorable forward dry reforming reaction and reverse water gas shift reaction due to removal of carbon formed in the CARGEN reactor (reactor 1) and addition of methane to the combined reformer (second reactor).

Example 5

Figure 7:
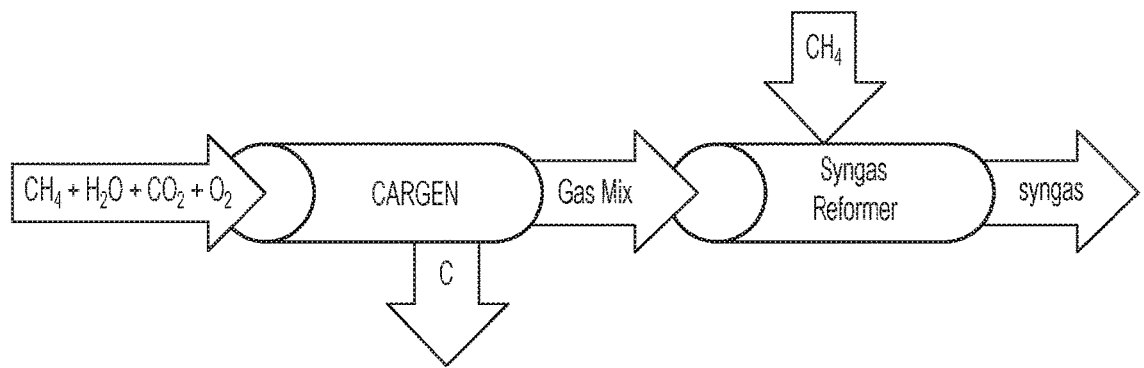
FIG. 7 shows an embodiment according to Example 5 of the present subject matter.

This embodiment is specific to the choice of feed to the reactors. FIG. 7 shows a schematic of the two-reactor set up as described in EXAMPLE 1. The feed to this reactor essentially includes methane, carbon dioxide, steam, and oxygen in different ratios. The gas mixture leaving the first reactor (CARGEN unit) is sent to the second reactor in which additional methane is added to increase carbon content of the syngas produced during the combined reforming reaction.

The following case example relates to EXAMPLE 5, in which the feed to the first reactor contains methane, carbon dioxide, steam, and oxygen, while additional methane is fed to the second reactor to increase carbon content of the product syngas. The feed compositions are listed in Table 9 below.

TABLE 9

Feed Composition and Operating Conditions of Reactors

| Component Fed/Operating Condition | Value |
|---|---|
| $CH_4$ (reactor 1) | 1 mole |
| $O_2$ (reactor 1) | 0.1 mole |
| $CO_2$ (reactor 1) | 0.6 mole |
| $H_2O$ (reactor 1) | 0.6 mole |
| $CH_4$ (reactor 2) | 0.3 mole |
| $T_1$ (reactor 1) | 693.15K |
| $P_1$ (reactor 1) | 25 bar |
| $T_2$ (reactor 2) | 1093.15K |
| $P_2$ (reactor 2) | 25 bar |

TABLE 10

Product Composition of Reactors

| Product | Reactor 1 Composition | Reactor 2 Composition |
|---|---|---|
| $CH_4$ | 0.651588 | 0.451764 |
| $H_2O$ | 1.218518 | 0.794642 |
| $O_2$ | 0 | 0 |
| CO | 0.00254 | 0.578313 |
| $CO_2$ | 0.389471 | 0.313522 |
| $H_2$ | 0.078305 | 1.50183 |
| Carbon | 0.5564 | 0 |
| Energy (Kj) | −1.07446 | 211.7617 |
| $CO_2$% conversion | 35.1 | 47.74 |

As can be seen in Table 10, the carbon formation in reactor 1 is 0.5564 moles with $CO_2$% conversion of 35.1%, and the corresponding energy requirement is −1.07446 kJ. On the other hand, the carbon formation in reactor 2 is zero with an energy requirement of 211.7617 kJ. The overall $CO_2$% conversion after reactor 2 is at 47.74%. The $CO_2$% conversion is slightly increased due to the presence of a reasonable quantity of steam which produces $CO_2$ in addition to syngas upon reaction.

Example 6

Figure 8:
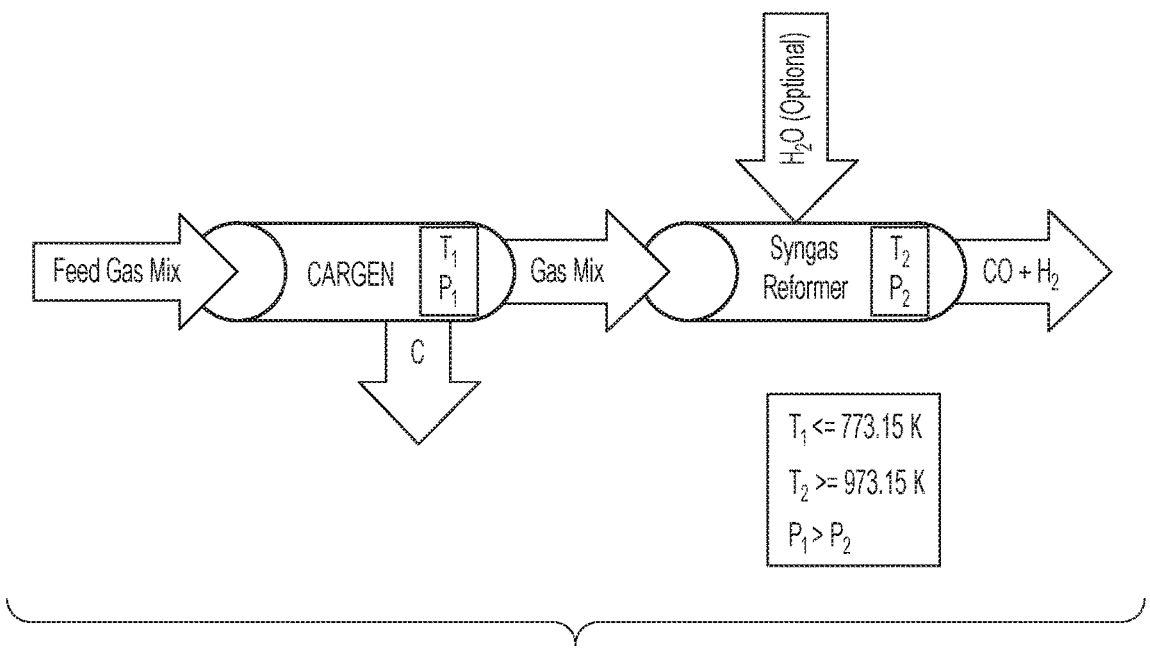
FIG. 8 shows an embodiment according to Example 6 of the present subject matter.

This embodiment is specific to the operating conditions associated with the operation of the dual reactor carbon fixation model described in EXAMPLES 1-5. As shown in FIG. 8, the operating temperature of the first reactor (CARGEN unit) should be maintained below 773.15 K for at least 40% conversion of $CO_2$ in the feed gas mix (containing any combination of feeds described in EXAMPLES 1-5) to carbon, while having negligible (maximum one tenth of carbon generated) CO and $H_2$ generation. The temperature of the second reactor should be maintained above 973.15 K for syngas generation and also to maintain zero carbon formation. The pressures of both the reactors, however, are different with an effective pressure swing between the two units. The pressure of the first reactor (CARGEN) should always be maintained above the pressure of the second reactor (combined reformer).

The following case example relates to the EXAMPLE 6 in which the pressure in reactor 1 is maintained above the pressure in reactor 2 to emphasize the effect of a pressure swing on the $CO_2$% conversion from the overall system. As a case example, this system comprises of a feed to the first reactor containing methane, carbon dioxide, and oxygen, while additional steam is fed to the second reactor to increase the syngas yield ratio of the product syngas. The feed compositions are listed in Table 11 below.

TABLE 11

Feed Composition and Operating Conditions of the Reactors

| Component Fed/Operating Condition | Value |
|---|---|
| $CH_4$ (reactor 1) | 1 mole |
| $O_2$ (reactor 1) | 0.1 mole |
| $CO_2$ (reactor 1) | 0.6 mole |
| $H_2O$ (reactor 2) | 0.3 moles |
| $T_1$ (reactor 1) | 693.15K |
| $P_1$ (reactor 1) | 25 bar |
| $T_2$ (reactor 2) | 1093.15K |
| $P_2$ (reactor 2) | 15 bar |

TABLE 12

Product Composition of Reactors

| Product | Reactor 1 Composition | Reactor 2 Composition |
|---|---|---|
| $CH_4$ | 0.52621 | 0.11877 |
| $H_2O$ | 0.88706 | 0.77963 |
| $O_2$ | 0 | 0 |
| CO | 0.00177 | 0.40921 |
| $CO_2$ | 0.25558 | 0.25558 |
| $H_2$ | 0.25558 | 1.28282 |
| Carbon | 0.8164 | 0 |
| Energy (Kj) | −11.9547 | 162.561 |
| $CO_2$% conversion | 57.4 | 57.4 |

As can be seen in Table 12, the carbon formation in reactor 1 is 0.8164 moles with $CO_2$% conversion of 57.4%, and the corresponding energy requirement is −11.9547 kJ. The carbon formation in reactor 2 is found to be zero with an energy requirement of 162.561 kJ. The overall $CO_2$% conversion after reactor 2 is at 57.4%. In this scheme, no drop-in $CO_2$% conversion is seen between the two reactors, which can be attributed to a decrease in system pressure. Thus, a pressure swing between the two reactors (with $P_1 > P_2$) has a better effect on $CO_2$% conversion.

Example 7

Figure 9:
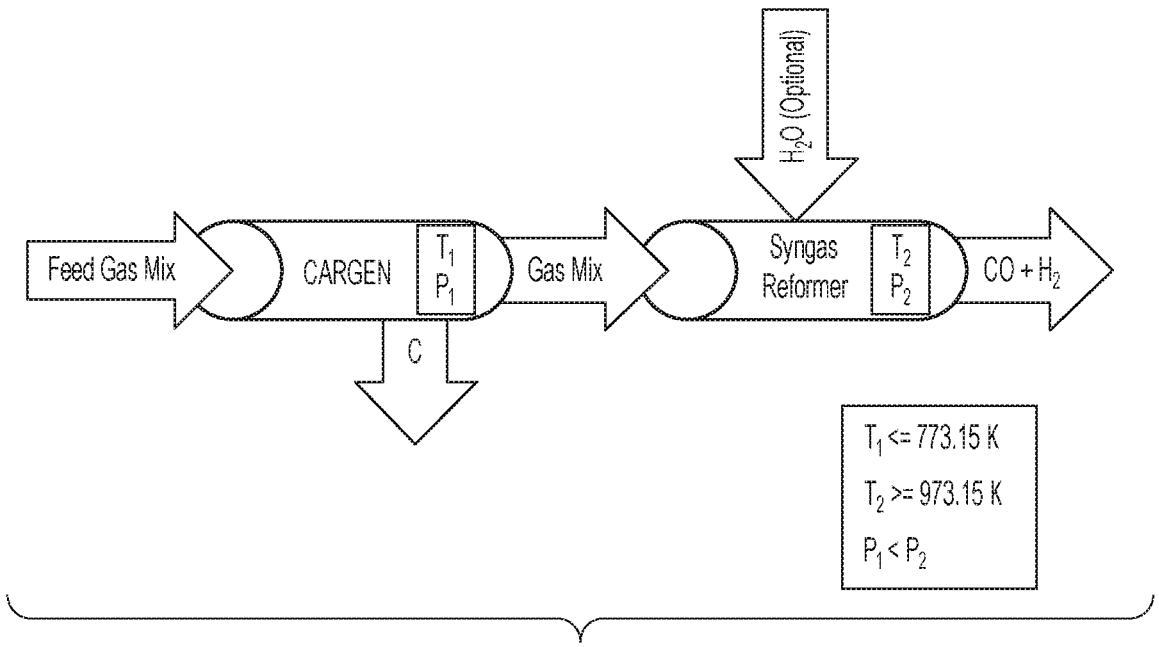
FIG. 9 shows an embodiment according to Example 7 of the present subject matter.

This embodiment is specific to the operating conditions associated with the operation of the dual reactor for carbon fixation model as described in EXAMPLES 1-5. The operating temperature of the first reactor (CARGEN unit) as shown in FIG. 9 should be maintained below 773.15 K for effective conversion of $CO_2$ in the feed gas mix (containing any combination of feeds described in EXAMPLES 1-5) to carbon, while having negligible CO and $H_2$ generation. The temperature of the second reactor should be maintained above 973.15 K for syngas generation and zero carbon formation. The maximum temperature of this reactor is recommended not to exceed the conventional reformer setup (~1173.15 K). This is because there is no additional benefit of going above these temperatures in terms of energy requirements compared to conventional reformer setups.

The pressures of both the reactors, however, are different with an effective pressure swing between the two units. The pressure of reactor one (CARGEN) should always be maintained below the pressure of the second reactor (combined reformer) with a pressure boost up between the two units. In order for sufficient work and energy extraction, as described earlier, the pressure gradient is recommended to be about 10 bar, which also improves the selective yields of carbon in the first reactor and syngas in the second reactor.

The following case example relates to EXAMPLE 7 in which the pressure in the first reactor (reactor 1) is maintained below the pressure in the second reactor (reactor 2) with a pressure boost up between the two reactors to emphasize the effect of the pressure swing on the $CO_2$% conversion from the overall system. As a case example, this system comprises of a feed to the first reactor containing methane, carbon dioxide, and oxygen, while additional steam is fed to the second reactor to increase the syngas yield ratio of the product syngas. The feed compositions and operating conditions are listed in Table 13 below.

TABLE 13

Feed Composition and Operating Conditions of Reactors

| Component Fed/<br>Operating Condition | Value |
| --- | --- |
| $CH_4$ (reactor 1) | 1 mole |
| $O_2$ (reactor 1) | 0.1 mole |
| $CO_2$ (reactor 1) | 0.6 mole |
| $H_2O$ (reactor 2) | 0.3 moles |
| $T_1$ (reactor 1) | 693.15K |
| $P_1$ (reactor 1) | 15 bar |
| $T_2$ (reactor 2) | 1093.15K |
| $P_2$ (reactor 2) | 25 bar |

TABLE 14

Product Composition of Reactors

| Product | Reactor 1 Composition | Reactor 2 Composition |
| --- | --- | --- |
| $CH_4$ | 0.52196 | 0.18064 |
| $H_2O$ | 0.87795 | 0.83345 |
| $O_2$ | 0 | 0 |
| CO | 0.00232 | 0.34046 |
| $CO_2$ | 0.25987 | 0.26305 |
| $H_2$ | 0.07813 | 1.10527 |
| Carbon | 0.8159 | 0 |
| Energy (Kj) | −11.1039 | 147.664 |
| $CO_2$% conversion | 56.6 | 56.1 |

As can be seen in Table 14, the carbon formation in reactor 1 is 0.8159 moles with $CO_2$% conversion of 56.6%, and the corresponding energy requirement is −11.1039 kJ. The carbon formation in reactor 2 is found to be zero with an energy requirement of 147.664 kJ. The overall $CO_2$% conversion after reactor 2 is at 56.1%. This in comparison with the results of case example of EXAMPLE 7 has seen a small drop-in $CO_2$% conversion. The drop-in $CO_2$% conversion in both the reactors show that a relatively lower pressure in reactor 1 compared to reactor 2 has no benefit in terms of $CO_2$% conversion, however energy requirements have dropped significantly in reactor 2. It should also be noted that a higher pressure in reactor 1 is favorable for better $CO_2$% conversion, as we see a drop in about 1% in the $CO_2$% conversion between the two schemes. The decrease in the energy requirements in the reactor 2 should however account for the carbon credits associated with the compression duty in reactor 2 to make a fair comparison between the two schemes.

Example 8

Figure 10:
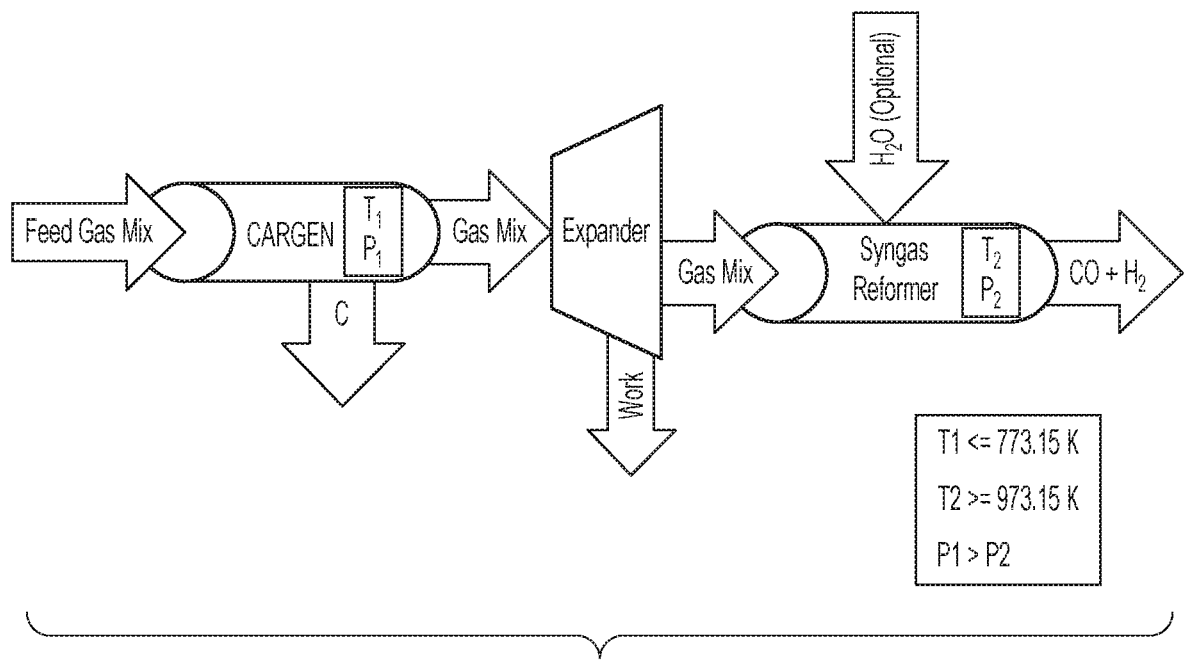
FIG. 10 shows an embodiment according to Example 8 of the present subject matter.

This embodiment is specific to the operating conditions associated with the operation of the dual reactor setup with addition of a work recovery unit. The operating temperature of the first reactor (CARGEN unit) as shown in FIG. 10 should be maintained below 773.15 K (minimum 573.15 K) to get at least 40% $CO_2$ conversion in the feed gas mix (containing any combination of feeds described in EXAMPLES 1-5) to carbon, while having negligible (maximum one tenth of the carbon produced) syngas generation. The temperature of the second reactor should be maintained above 973.15 K for syngas generation and zero carbon formation. The pressures of both reactors, however, are different with an effective pressure swing between the two units.

Due to the substantial pressure difference between the two units, an additional expander or turbine unit could be added for generating external work. The benefit of addition of the expander is not only to derive external work, but also to let down the pressure for the combined reformer unit, as the performance of the combined reformer significantly increases with decrease in pressure. For this, the operating pressure of the first reactor (CARGEN) should always be maintained above the pressure of the second reactor (combined reformer).

It is to be understood that the two-stage methane reformer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A two-stage reactor system comprising a first reactor for a first stage and a second reactor for a second stage, for capturing carbon and producing syngas, comprising:
    a compression unit for compressing gas feed inputs;
    the first reactor configured for receiving the compressed gas feed and producing a solid carbon and unreacted gases;
    an electrostatic precipitator configured for receiving the unreacted gases and separating a recovered solid carbon and a reactor feed gas therefrom;
    a solid carbon and a catalyst recovery unit configured for receiving the solid carbon from the first reactor and the recovered solid carbon from the electrostatic precipitator;
    a heat exchanger configured for receiving the reactor feed gas from the precipitator and providing high temperature reactor feed gases; and
    the second reactor configured for receiving the high temperature reactor feed gases from the heat exchanger and providing an output of high temperature syngas back to the heat exchanger, wherein the first reactor comprises at least one first catalyst wherein the at least one first catalyst includes at least one of calcite, dolomite, and coal; wherein the second reactor comprises at least one second catalyst, the at least one second catalyst being different from the at least one first catalyst and wherein the at least one second catalyst is a sacrificial surface catalyst that is removed without the use of additional steam.

2. The two-stage reactor system of claim 1, further comprising a work and energy recovery unit configured for receiving unreacted gases from the first reactor, the work and energy recovery unit being selected from the group consisting of an expander and a turbine generator.

3. The two-stage reactor system of claim 1, further comprising a discarded carbon and catalyst collector for collecting carbon and catalyst discarded from the solid carbon and catalyst recovery unit.

4. A method comprising
providing a compressed feed gas comprising carbon dioxide and at least one volatile organic compound reactor to a first reactor, the first reactor being a carbon generating reactor and comprising a first catalyst;
producing a gaseous product and a solid carbon in the first reactor, the gaseous product including at least one of the flue gases, carbon dioxide, and an unreacted methane;
removing the solid carbon from the first reactor;
feeding the gaseous product produced in the first reactor to a second reactor to produce synthesis gas, the second reactor comprising a second catalyst, the second catalyst being different from the first catalyst, wherein the first reactor comprises at least one first catalyst wherein the at least one first catalyst includes at least one of calcite, dolomite, and coal; wherein the second reactor comprises at least one second catalyst, the at least one second catalyst being different from the at least one first catalyst and wherein the second catalyst is a sacrificial surface catalyst that is removed without the use of additional steam.

5. The method of claim 4, further comprising pretreating the gaseous products produced in the first reactor prior to feeding the gaseous products to the second reactor, the pretreating comprising subjecting the gaseous products to at least one of heating and cyclone separation.

6. The method of claim 4, further comprising:
operating the first reactor at a first temperature;
operating the second reactor at a second temperature, the second temperature being higher than the first temperature.

7. The method of claim 6, wherein the first temperature is below about 773K.

8. The method of claim 6, wherein the second temperature is above about 973K.

9. The method of claim 4, further comprising:
operating the first reactor at a first pressure;
operating the second reactor at a second pressure, the first pressure being higher than the second pressure.

10. The method of claim 4, further comprising:
operating the first reactor at a first pressure;
operating the second reactor at a second pressure, the first pressure being lower than the second pressure.

11. The method of claim 4, wherein the compressed feed gas further comprises at least one oxidant selected from the group consisting of oxygen and steam.

12. The method of claim 4, wherein the volatile organic compound is selected from the group consisting of methane, ethanol, methanol, and glycerol.

13. The method of claim 4, further comprising adding at least one of an organic volatile compound, oxygen, and steam to the second reactor.

14. The method of claim 4, further comprising extracting work and energy from a work and energy recovery unit installed downstream of the first reactor, the work and energy recovery unit being selected from a group consisting of an expander and a turbine generator.

* * * * *